(12) United States Patent
Wilson et al.

(10) Patent No.: US 7,703,142 B1
(45) Date of Patent: Apr. 20, 2010

(54) SOFTWARE LICENSE AUTHORIZATION SYSTEM

(75) Inventors: Patrick D. Wilson, Denver, CO (US);
Joao C. Teixeira, Shawnee, KS (US);
Kenneth V. George, Houston, TX (US);
Adam C. Workman, Greenwood Village, CO (US)

(73) Assignee: Sprint Communications Company L.P., Overland Park, KS (US)

( * ) Notice: Subject to any disclaimer, the term of this patent is extended or adjusted under 35 U.S.C. 154(b) by 1333 days.

(21) Appl. No.: 10/840,317

(22) Filed: May 6, 2004

(51) Int. Cl.
| G06F 7/04 | (2006.01) |
| G06F 17/30 | (2006.01) |
| H04L 9/32 | (2006.01) |
| H04N 7/16 | (2006.01) |
| B41K 3/38 | (2006.01) |
| G06F 21/00 | (2006.01) |
| G06Q 20/00 | (2006.01) |

(52) U.S. Cl. .............................. 726/26; 726/2; 713/168; 380/59; 705/51; 705/64

(58) Field of Classification Search ..................... 726/26
See application file for complete search history.

(56) References Cited

U.S. PATENT DOCUMENTS

| 5,758,068 | A | * | 5/1998 | Brandt et al. | 726/27 |
| 5,765,152 | A | * | 6/1998 | Erickson | 707/9 |
| 6,389,538 | B1 | * | 5/2002 | Gruse et al. | 713/194 |
| 6,857,067 | B2 | * | 2/2005 | Edelman | 713/155 |
| 7,017,188 | B1 | * | 3/2006 | Schmeidler et al. | 726/26 |
| 2002/0103761 | A1 | * | 8/2002 | Glassco et al. | 705/59 |

* cited by examiner

Primary Examiner—Nasser Moazzami
Assistant Examiner—Oscar A Louie

(57) ABSTRACT

An authorization system is described that includes a first interface, a processing system, and a second interface. The first interface is configured to receive an authorization instruction from an enterprise and receive an authorization request from a user device. The authorization instructions indicate authorization parameters. The user device transfers the authorization request each time the application is selected for execution. The authorization instructions are based on a license obtained by the enterprise for an application and wherein a user device operated by a user has the application. The processing system is configured to process the authorization request and authorization parameters to determine if the execution of the application is authorized. The second interface is configured to transfer an authorized message to the user device if the execution of the application is authorized and transfer an unauthorized message to the user device if the execution of the application is not authorized.

18 Claims, 12 Drawing Sheets

SOFTWARE LICENSE AUTHORIZATION SYSTEM

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

The invention is related to authorization systems for software licenses, and in particular, to an authorization system for managing software licenses on mobile devices.

2. Description of the Prior Art

In recent years, mobile software applications have become more available and diverse as the capabilities and reach of mobile communication networks have increased. The range of mobile communication devices that run mobile software applications has expanded to include mobile phones, mobile music devices, personal digital assistants (PDAs), pagers, and standard laptop computers. However, several problems related to licensing have arisen along with the rise in popularity of mobile devices and applications.

One problem associated with licensing mobile software applications is the difficulty of administering licenses for devices that are not connected to an enterprise network. Licensing system are typically obtained by an enterprise from a software vendor. For example, an enterprise such as a corporation or university might purchase a software suite from a software vendor. Along with the suite, the vendor might provide licensing software to control the use of the purchased software suite. The licensing software would then be installed on a licensing server within the enterprise network.

The resulting licensing system (licensing software installed on a licensing server) would then employ a licensing model for regulating the use of the software suite. In one example, the named-user licensing model typically identifies specific individuals within an enterprise who are authorized to use an application. The individuals are identified when they log into the enterprise network. If an individual is not listed as an authorized user with the licensing system, then the individual is prevented from using the desired application.

The named-user licensing model is effective for devices connected to the enterprise network, thereby enabling the licensing system to communicate with the devices and allow or not allow the use of applications. However, such a model is not effective for licensing mobile applications because mobile devices are frequently not connected to the enterprise network. The licensing system within the enterprise network is therefore unable to communicate with the mobile device. Additionally, some types of software applications present unique security problems for enterprise networks. For example, instant messaging (IM) applications create security holes into enterprise networks. Thus, it is not desirable to require a mobile device to connect to a licensing system within an enterprise network to authorize the use of an IM application.

As can be seen from the above discussion, the introduction of mobile software applications has increased the need for software license management systems that provide license control to software vendors and flexibility to purchasing enterprises. A solution is therefore desired to provide improved software licensing mechanisms for mobile software applications.

SUMMARY OF THE INVENTION

The invention helps solve the above and other problems by providing an authorization system that authorizes a user to use a software application each time the application is selected for execution. In accordance with the invention, an enterprise obtains a license for an application and transfers authorization instructions for the license based on the license to the authorization system. A user device operated by the user has the application.

A method for operating the authorization system includes the following steps. One step of the method includes receiving the authorization instructions into the authorization system from the enterprise wherein the authorization instructions indicate authorization parameters. Another step includes receiving an authorization request into the authorization system from the user device. In this step, the user device transfers the authorization request each time the application is selected for execution. The authorization request indicates the application, the enterprise, and at least one of the user and the user device. Another step includes processing the authorization request and the authorization parameters to determine if the execution of the application is authorized. If the execution of the application is authorized, another step includes transferring an authorized message to the user device. The user device then executes the application in response to the authorized message. If the execution of the application is not authorized, another step includes transferring an unauthorized message to the user device. The user device does not execute the application in response to the application execution unauthorized message.

The authorization system may include a first interface, a processing system, and a second interface. The first interface is configured to receive an authorization instruction from the enterprise and receive an authorization request from the user device. The processing system is configured to process the authorization request and the authorization parameters to determine if the execution of the application is authorized. The second interface is configured to transfer an authorized message to the user device if the execution of the application is authorized and transfer an unauthorized message to the user device if the execution of the application is not authorized.

BRIEF DESCRIPTION OF THE DRAWINGS

The same reference number represents the same element on all drawings.

DETAILED DESCRIPTION OF THE PREFERRED EMBODIMENT

FIGS. 1-6F and the following description depict specific embodiments of the invention to teach those skilled in the art how to make and use the best mode of the invention. For the purpose of teaching inventive principles, some conventional aspects have been simplified or omitted. Those skilled in the art will appreciate variations from these embodiments that fall within the scope of the invention. Those skilled in the art will appreciate that the features described below can be combined in various ways to form multiple embodiments of the invention. As a result, the invention is not limited to the specific embodiments described below, but only by the claims and their equivalents.

First Embodiment Configuration and Operation

FIGS. 1-2

Figure 1:
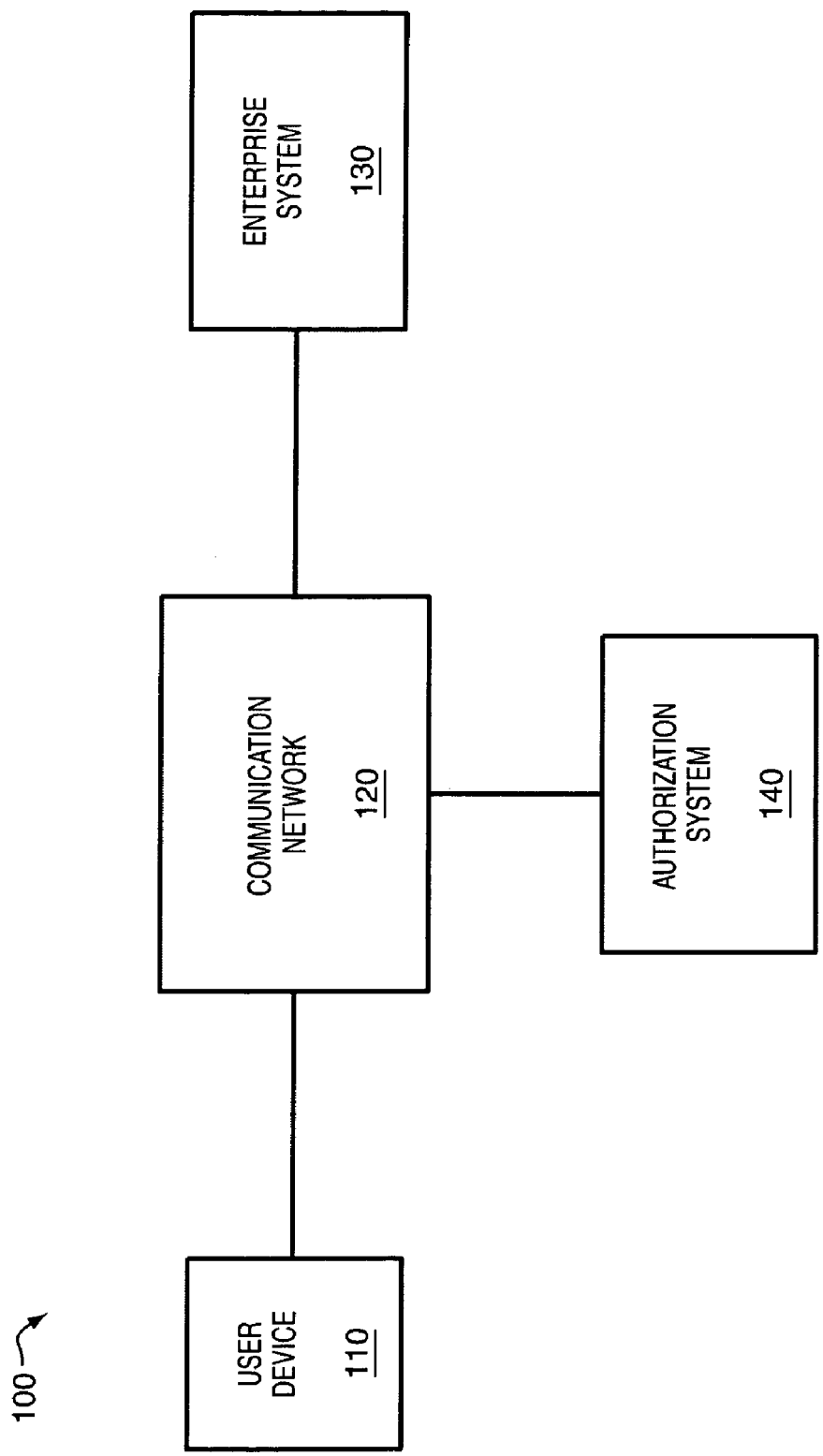
FIG. 1 illustrates a communication network in an embodiment of the invention.

FIG. 1 illustrates communication network 100 in an embodiment of the invention. Communication network 100 includes user device 110, communication system 120, enterprise system 130, and authorization system 140. User device 110 is in communication with authorization system 140 through communication system 120. Similarly, enterprise system 130 is in communication with authorization system 140 through communication system 120.

Figure 2:
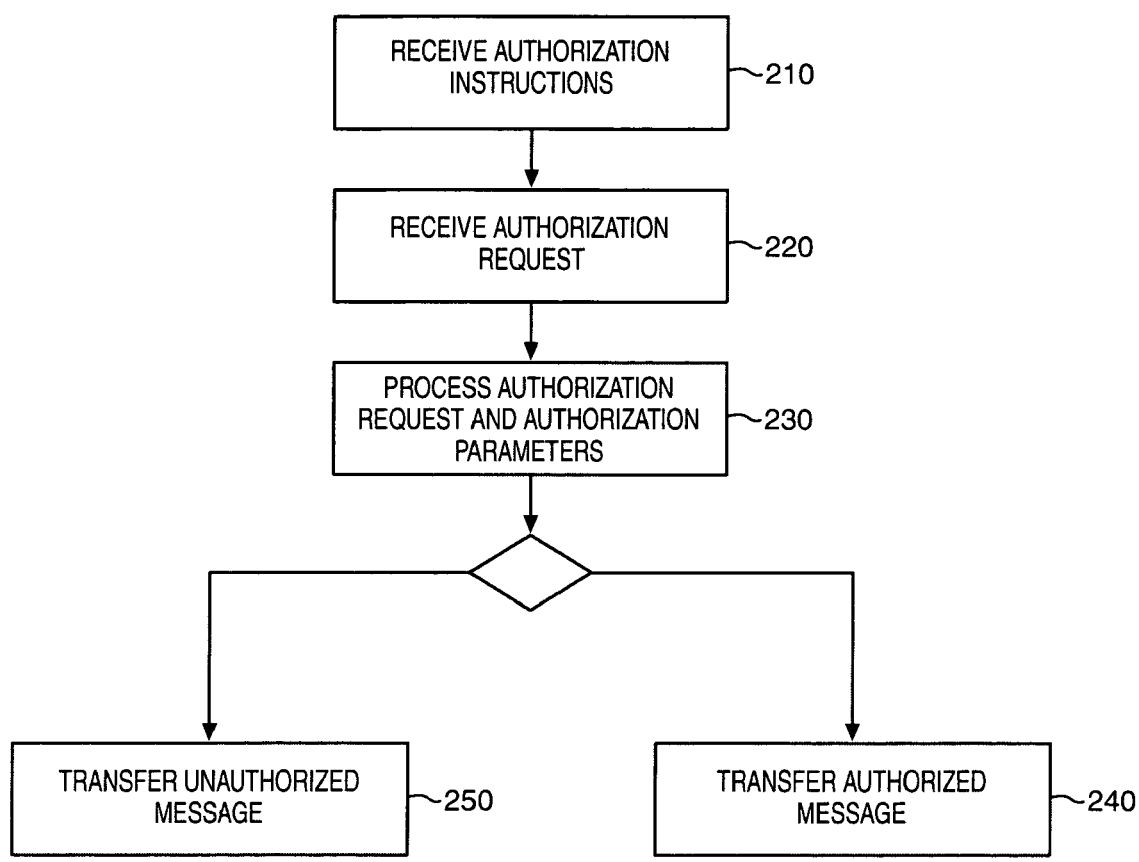
FIG. 2 illustrates the operation of the communication network of FIG. 1 in an embodiment of the invention.

Communication system 120 could be a routing system such as an intranet, the Internet, a wireless routing system, the public switched telephone network (PSTN), or any other communication system capable of routing communications. User device 110 could be any mobile communication device capable of transferring an authorization request to authorization system 140, and receiving an authorized message and an unauthorized message from authorization system 140. Authorization system could be any system capable of receiving authorization instructions from enterprise system 130, receiving the authorization request from user device 110, and transferring the authorized message and the unauthorized message to user device 110. Enterprise system 130 could be any system capable of transferring authorization instructions to authorization system FIG. 2 illustrates the operation of communication network 100 in an embodiment of the invention. To begin, an enterprise, such as a corporation, university, a governmental entity or some other enterprise, obtains a license for an application. The enterprise operates enterprise system 130. The enterprise, using enterprise system 130, transfers authorization instructions for the license based on the license to authorization system 140. User device 110 is used by a user and user device 110 has the application for the enterprise obtained the license.

Authorization system 140 receives the authorization instructions transferred from enterprise system 130 (Step 210). The authorization instructions indicate authorization parameters for the application used by the user on user device 110. Next, authorization system 140 receives an authorization request from user device 110 (Step 220). User device 110 transfers the authorization request each time the application is selected for execution by the user. Additionally, the authorization request indicates the selected application, the enterprise, and either the user, user device 110, or both.

Authorization system 140 processes the authorization request and the authorization parameters to determine if the execution of the application is authorized (Step 230). If the execution of the application is authorized, authorization system 140 transfers an authorized message to user device 110 (Step 240). The user can then use the application on user device 110 as a result of the authorized message. If the execution of the application is not authorized, authorization system 140 transfers an unauthorized message to user device 110 (Step 250). The user is not able to use the application on user device 110 as a result of the unauthorized message.

Advantageously, the configuration and operation of authorization system 140 allows software vendors to control the use of their software without imposing unnecessary restrictions on an enterprise that purchases the software. Authorization system 140 provides the ability for an enterprise to manage licenses for mobile software applications on mobile devices without requiring the mobile devices to connect to the enterprise. For example, user device 110 is in communication with authorization system 140 rather than enterprise network 130. Such an advantage allows for the proper management of licenses for applications that create security issues for enterprises, such as instant messaging applications. Additionally, the configuration and operation of authorization system 140 allows users to change mobile devices and retain authorization to use an application on a new mobile device.

Second Embodiment Configuration and Operation

FIGS. 3-6F

Figure 3:
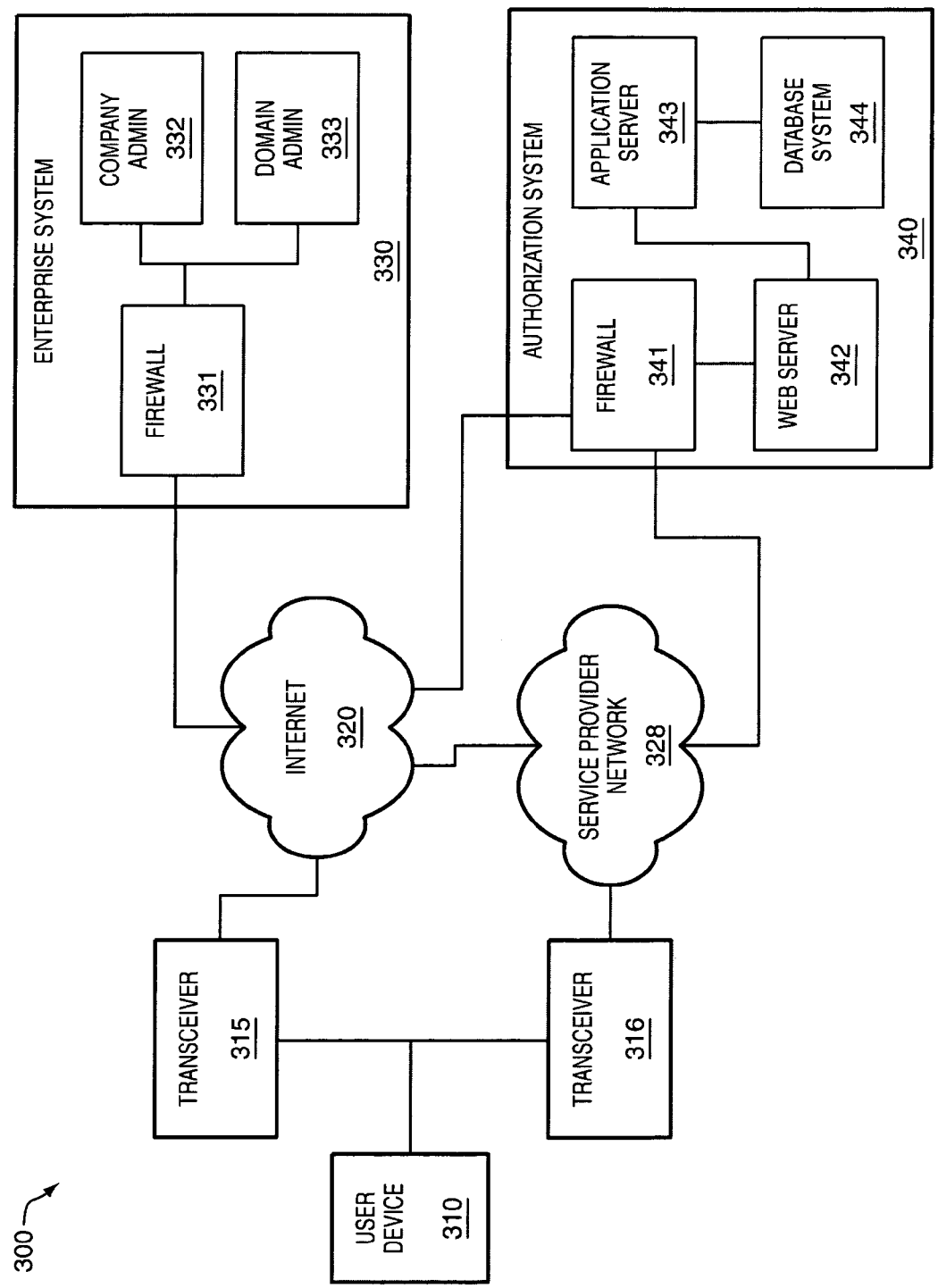
FIG. 3 illustrates an authorization network in an embodiment of the invention.

FIG. 3 illustrates authorization network 300 in an embodiment of the invention. Authorization network 300 includes user device 310 in communication with transceiver 315 and transceiver 316. Transceiver 315 is coupled to Internet 320. Transceiver 316 is coupled to service provider network 346. Internet 320 is coupled to enterprise system 330, authorization system 340, and service provider network 346. Service provider network 346 is coupled to transceiver 316, authorization system 340, and Internet 320.

User device 310 is any mobile communication device capable of transmitting and receiving communications to and from transceivers 315 and 316. Examples of user device 310 include but are not limited to cell phones, personal digital assistants (PDAs), mobile music players, personal computers, laptop computers, and pagers. Transceiver 315 is any transceiver capable of transmitting and receiving communications to and from user device 310 and transmitting and receiving communications to and from Internet 320. Transceiver 316 is any transceiver capable of transmitting and receiving communications to and from user device 310 and transmitting and receiving communications to and from service provider network 346. Examples of transceivers 315 and 316 include but are not limited to wireless transceivers and wireless base station systems.

User device 310 is in communication with transceivers 315 and 316 over a wireless protocol such as code division multiple access (CDMA), time division multiple access (TDMA), Global System for Mobile Communications (GSM), wireless fidelity (WiFi), Bluetooth, or other similar wireless protocols well known to those skilled in the art. Transceiver 315 is in communication with Internet 320 using a packet based protocol such as internet protocol (IP), voice over IP (VoIP), or other, similar protocols including proprietary protocols. Similarly, transceiver 316 is in communication with service provider network 346 using a packet based protocol such as, but not limited to, IP, VoIP, or other, similar protocols including proprietary protocols.

Enterprise system 330 includes firewall 331, company administration work station 322, and domain administration work station 333. Authorization system 340 includes firewall 341, web server 342, application server 343, and database system 344. Firewalls 331 and 341 perform standard firewall operations including load balancing within enterprise system 330 and authorization system 340. Web server 342 provides web based access to application server 343. Application server 343 interfaces with database system 344. In an example of the invention, a company administrator within enterprise system 330 could use company administration station 332 to access database system 344 through Internet 320, web server 342, and application server 343. Similarly, a domain administrator could access database system 344 using domain administration station 333 through Internet 320, web server 342, and application server 343.

Figure 4:
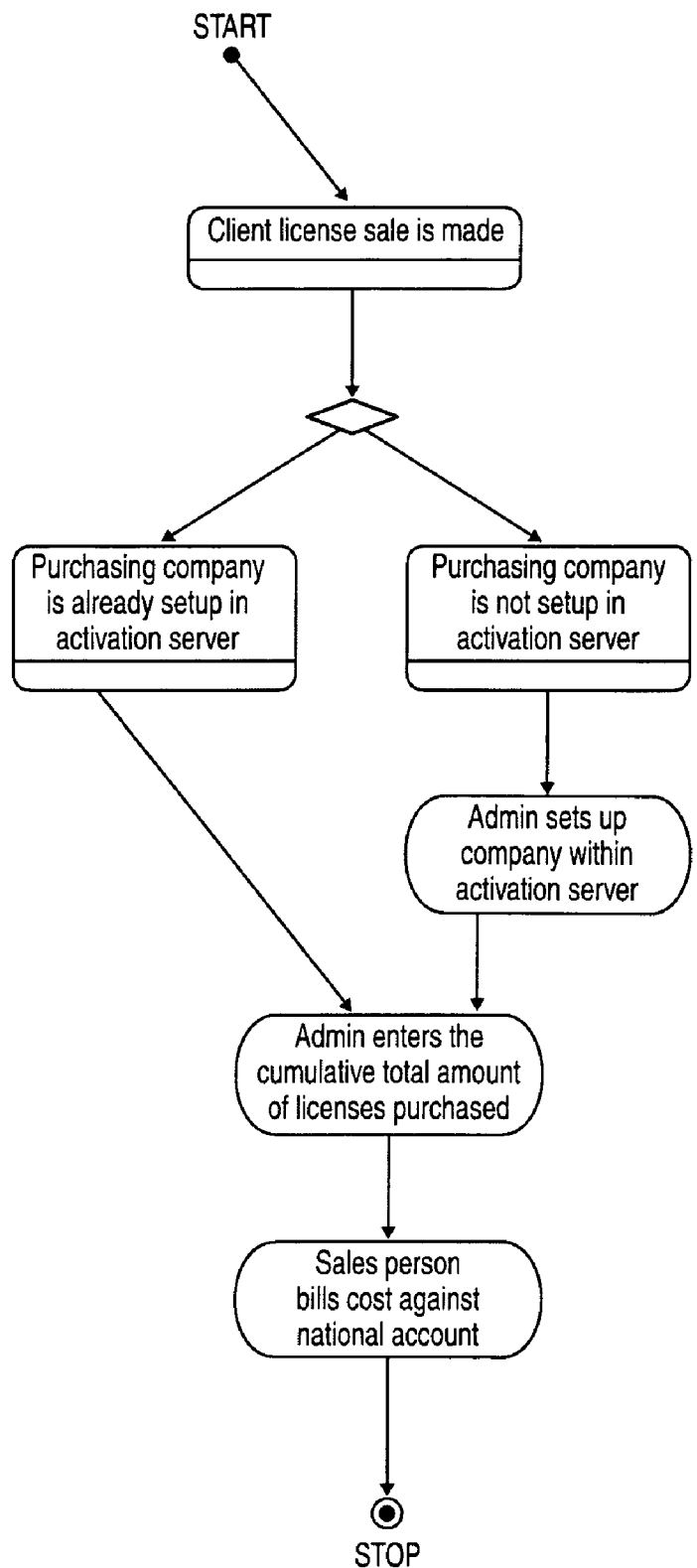
FIG. 4 illustrates a flow chart of a licensing provisioning process in an embodiment of the invention.

FIG. 4 illustrates a flowchart of the license provisioning process to help better understand the invention. Importantly, a user subscribes to a communication service provided by a service provider. The service provider operates service provider network 346 and authorization system 340. A license sale is made to an enterprise for a mobile software application. The enterprise could be, for example, a corporation, a university, or a governmental entity. The seller of the license could be a software vendor, a software retailer, or any other entity that licenses or sells software. The mobile software application is stored and run on user device 310. For example, the mobile software application could be an instant messaging application, gaming application, or some other application used by a user on user device 310. User device 310 could also be referred to as a client device.

After the license sale is made, the enterprise, using enterprise system 130, transfers authorization instructions for the license based on the license to authorization system 140. Authorization system 140 receives the authorization instructions. The authorization instructions indicate the application for which the license sale was made, the enterprise that purchased the license, and preferably could indicate the users that are allowed to use the application.

In an embodiment of the invention, an administrator within the enterprise transfers the authorization instructions by accessing database system 344, entering the name of the enterprise, and creating an enterprise administration account. Optionally, the administrator could setup associated domains under the parent enterprise. The administrator could also select a licensing model for each domain under the parent enterprise and create a domain administration account for each domain. A separate domain administrator could be associated with the domain administration accounts to administer the accounts. After setting up the various accounts, the administrator, whether an enterprise administrator or a domain administrator, enters the cumulative total amount of licenses that were purchased. The licenses can be allocated towards the enterprise overall or towards one of the domains under the enterprise.

Optionally, several license models can be implemented by the service provider on authorization system 340. The license models include the named user, concurrent user, node-locked, time-limited, enable/disable, package suite, pay-per-use, subscription based, value-based licensing, and open source models well known to those in the art. Preferably, a rigid licensing mode, diffusions licensing mode (checked and unchecked), or personal diffusion mode of licensing are implemented by the service provider for the enterprise on authorization system 340.

In the rigid licensing model, an information technology (IT) administrator of the enterprise is responsible for specifically identifying to authorization system 340 the users who are authorized to use the mobile software application on clients such as user device 310. Only those users authorized by the IT administrator are allowed use of the mobile software application.

In the diffusion licensing model, the up-front requirement of specifying allowed users is avoided. Rather, the diffusion licensing model is a first-come, first-serve model. Any user that desires to use the mobile software application will load the application on to their client device and attempt to use it. At this point, the client device notifies a licensing server of a licensing system, such as authorization system 340, of the attempted use. The licensing server is operated by the service provider. The licensing server performs a rule check to determine if the enterprise to which the user belongs has waived any additional approval procedures before allowing the user to use the application. If the enterprise has waived any additional procedures (unchecked model), the licensing server requests proof of a license from the client application. Upon receiving proof of the license, the licensing server allows the user to use the application on the client device.

If the enterprise requires additional authorization procedures (checked model), the user will be presented an information screen on the client device indicating that their request to use the mobile application has been forwarded to an IT administrator of the enterprise. The IT administrator receives the request and accesses the licensing server of the service provider to authorize the allocation of a license to the requesting user. The IT administrator then notifies the user that they are authorized and can now use the application.

In the personal diffusion licensing model, the user performs all licensing tasks. The user is permitted to visit a sanctioned location and purchase a client license for a mobile application. The user purchases the license using a personal credit card or some other similar purchasing method. The IT administrator is thus removed from any licensing responsibilities.

Figure 5A:
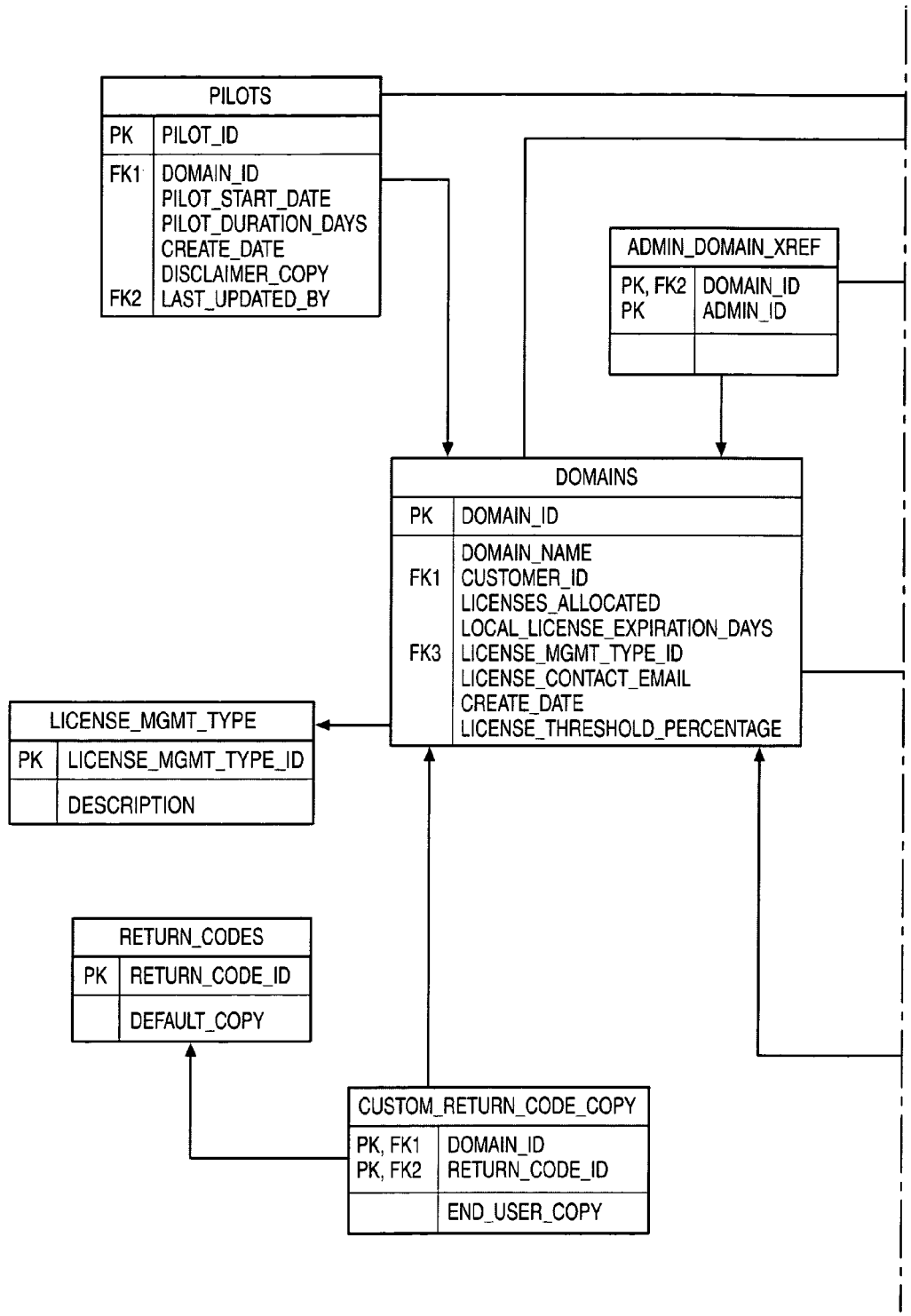
FIGS. 5A and 5B illustrate an entity relationship diagram in an embodiment of the FIGS. 6A-6F illustrates the operation of the authorization network of FIG. 3 in an embodiment of the invention.
Figure 5B:
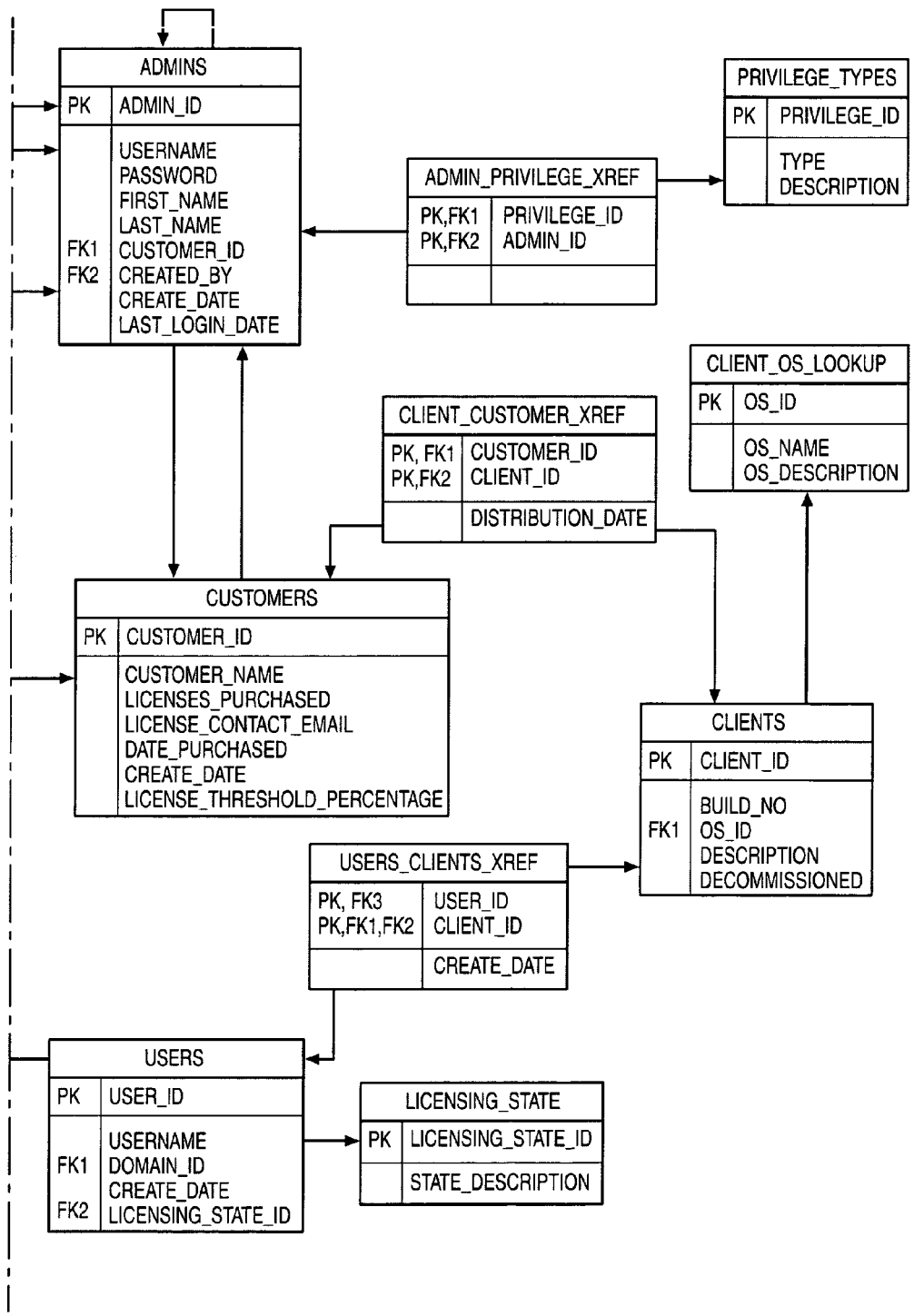
Figure 6A:
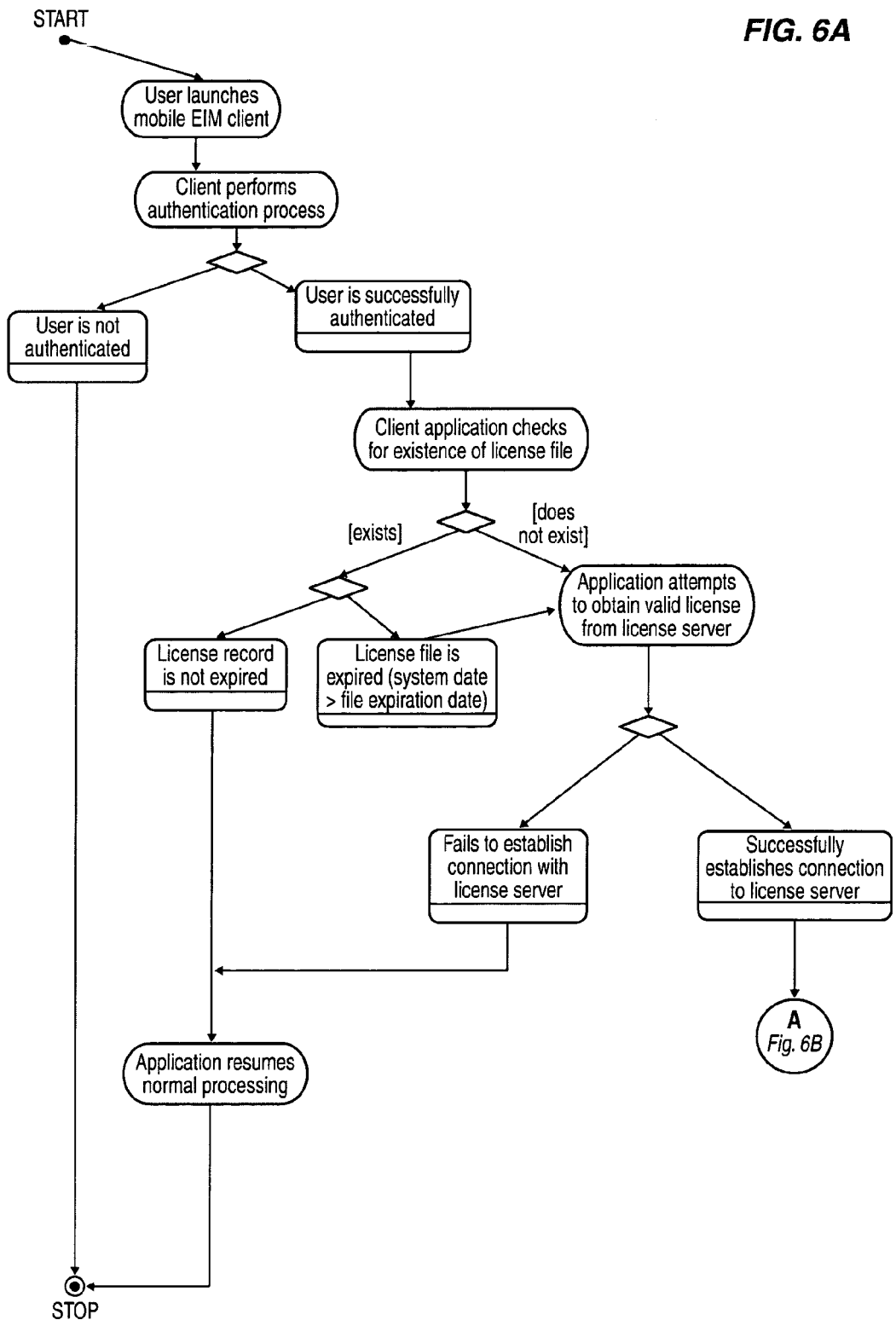
Figure 6B:
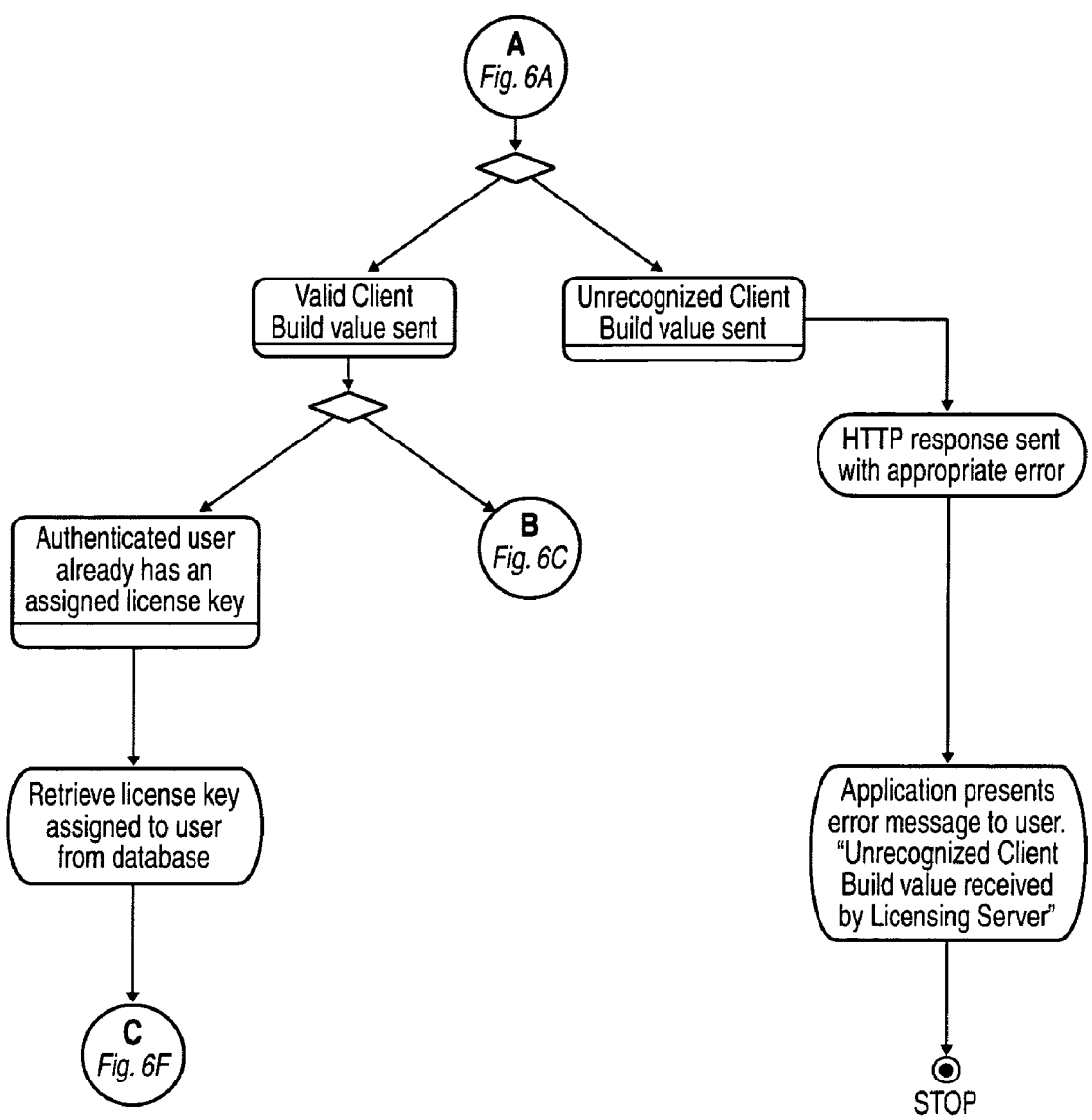
Figure 6C:
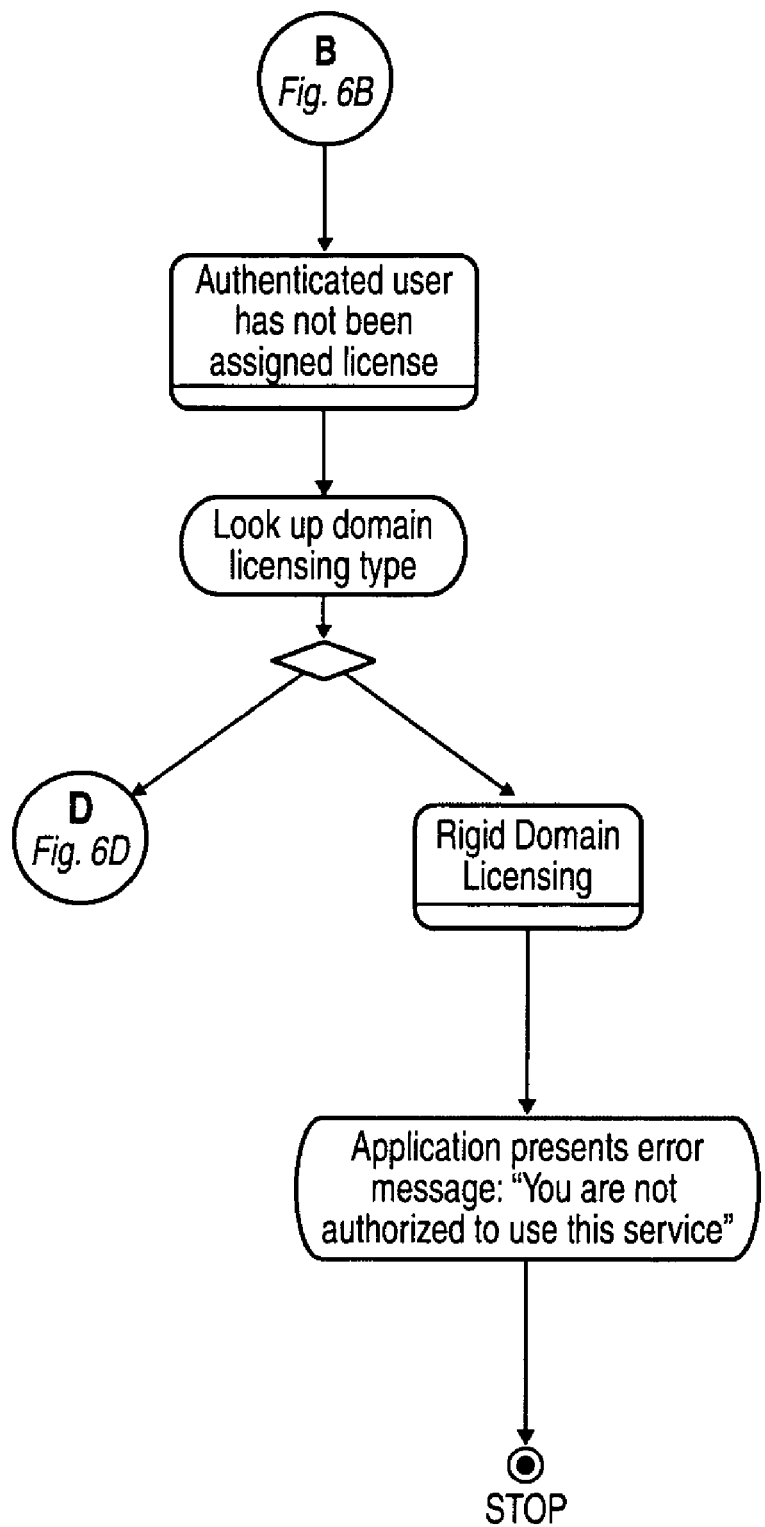
Figure 6D:
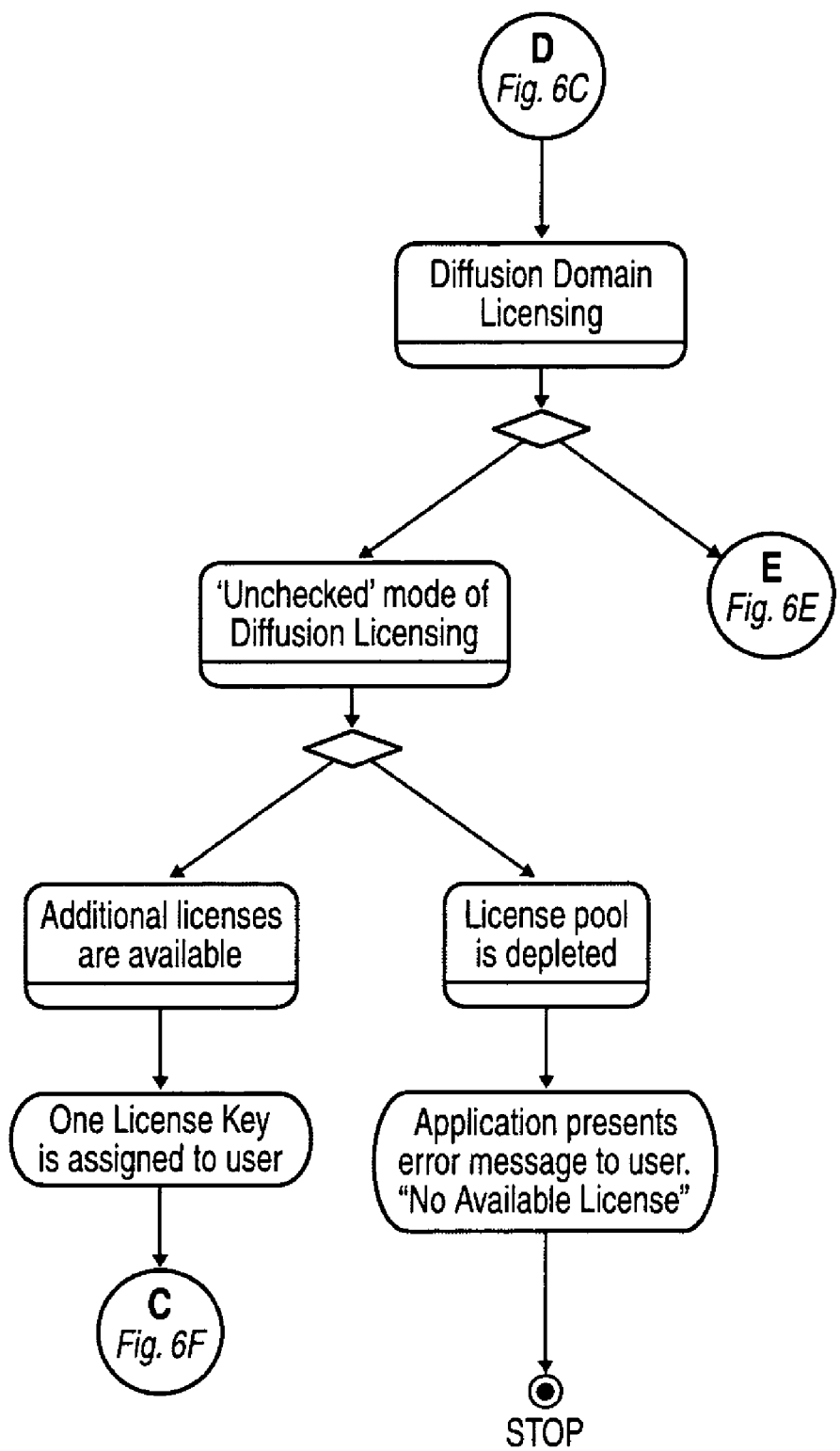
Figure 6E:
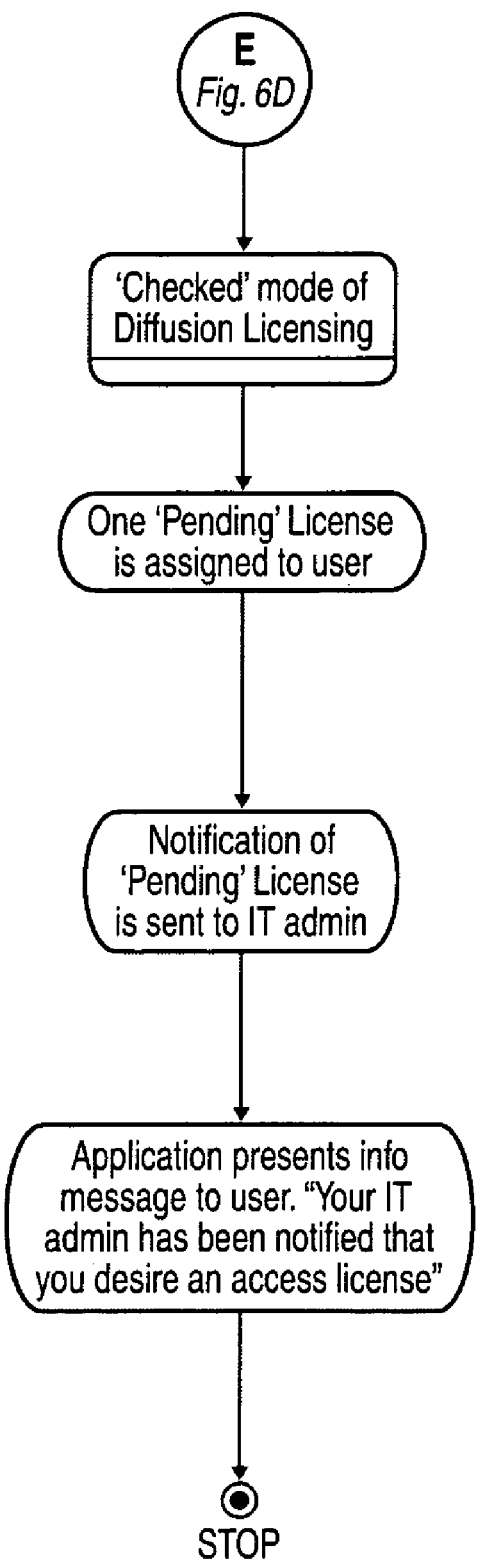
Figure 6F:
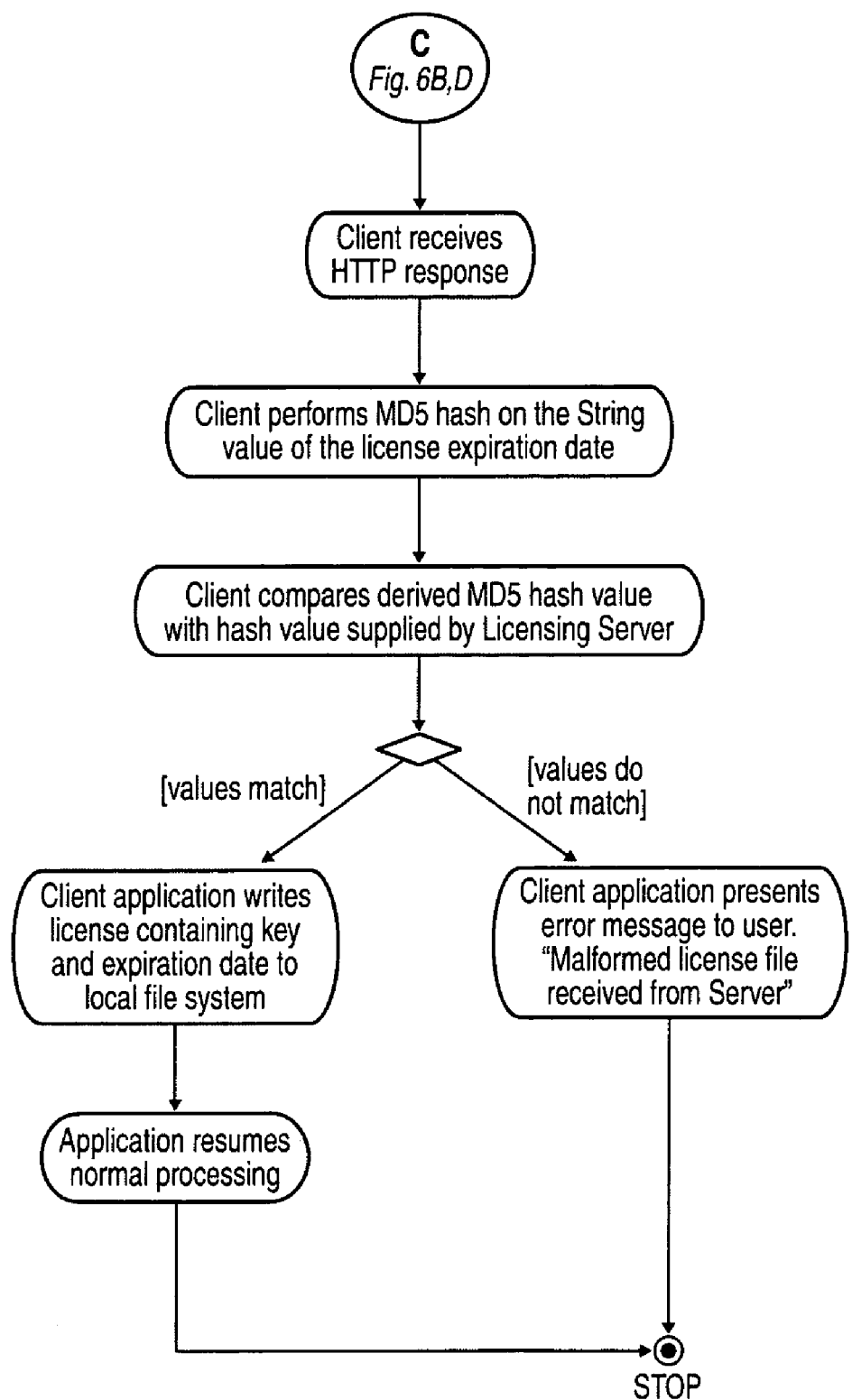

FIGS. 5A and 5B illustrate an entity relationship diagram (ERD) implemented on database system 344. The principles of databases utilized in the ERD of FIGS. 5A and 5B are well known to one skilled in the art. In this embodiment of the invention, database system 344 stores authorization instructions transferred from various enterprises in accordance with the ERD. The ERD of FIGS. 4 and 5 illustrates the relationships between the various data included within the authorization instructions. For example, the ERD illustrates multiple tables, each table having a set of fields. An administrator within the enterprise can populate the various fields of the tables with data that is then used to determine whether or not a user is authorized to use a client application on user device 310. Some fields are indicated as primary keys (PK) and foreign keys (FK). A foreign key always relates to a primary key. If data is inserted into a primary key field, that same data is also represented in any field labeled as a foreign key. Primary keys and foreign keys are well known to those in the art.

The following description illustrates how authorization instructions are implemented in a database in accordance with the ERD. To begin, the domain table of the ERD includes the domain_id field. The domain_id field stores a domain identification that represents a particular domain of a particular enterprise. For instance, if a corporation has a division, a domain may be created for the division in accordance with the process described in FIG. 4. A domain identification is created for the division and stored in the domain_id field within the domain table. The domain_id field is labeled as a primary key. As a primary key, other foreign keys in other tables are related to the domain_id primary key field in the domain table. Thus, once the domain_id field is populated in the domain table, the domain_id field in other fields that list the domain_id field as a foreign key are automatically populated with the same data as the primary domain_id field.

Other fields within the domain table include the following: domain_name, customer_id, licenses_allocated, license_mgmt_type_id, local_license_expiration_days, \license_contact_email, create_date, and license_threshold_percentage. The domain_name field holds the name of a domain. In the example provided above, the domain_name field holds the name of the division. The customer_id field holds a customer identification code associated with the domain. The licenses_allocated field holds a quantity of licenses assigned to the domain. The license_mgmt_type_id holds the management type associated with the licenses. For example, the management type could be the diffusion model, the unchecked model, or other management models. The local_license_expiration_days field holds the date that a local license expires on a client. The license_contact_email holds the email address for a contact associated with a license. The create_date field holds the date a license file was created. The license_threshold_percentage holds the percentage at which a quantity of allocated licenses compared to a total quantity of licenses reaches a particular threshold.

The pilots table includes the following fields: pilot_id, domain_id, pilot_start_date, pilot_duration_days, create_date, disclaimer_copy, and last_updated by. The pilot_id field holds an identification code associated with a pilot client application. The pilot_start_date field holds the start date for a pilot version of a client application. The pilot_duration_days field holds a number of days the a pilot version of a client application remains valid. The disclaimer_copy field holds a copy of a disclaimer. The last_updated_by fields identifies the last user to update a the pilot table.

The license_mgmt_type table license_mgmt_type_id and data description fields. The license_mgmt_type_id field holds an identification of the type of management model associated with the license. The data description field reserves space for user description.

The custom_return_code_copy table includes the domain_id, return_code_id, and data end_user_copy fields. The return_code_id field holds a return value for when a customer copy of a software application must be returned. For example, a customer such as an enterprise could be issued a demonstration copy of an application from a software vendor. If the demo application is then distributed to many mobile devices such as user device 310, the return_code_id field holds a date indicating when the application must either be deleted from the mobile devices or rendered inactive. The end_user_copy field indicates which version of copy of an application is used and distributed by a customer.

The return_codes table includes the return_code_id and data default_copy fields.

The admin_domain_xref table includes the domain_id and admin_id fields. The admin_domain_xref table is used to cross-reference domains with administrators authorized to administer the domains.

The admins table includes the admin_id, username, password, first_name, last_name, customer_id, created_by, create_date, and last_login date fields.

The customers table includes the customer_id, customer_name, licenses_purchased, license_contact_email, date_purchased, create_date, and license_threshold_percentage fields. The fields of the customers table hold data as described for the fields in the domain table.

The users table includes user_id, username, domain_id, create_date, and licensing_state_id fields. The licensing_state_id_field holds data indicating what state a license is in for a particular enterprise and application. For example, the license state could be active, pending, or canceled.

The admin_priviledge_xref table includes the priviledge_id and admin_id fields to cross reference access privileges with individual administrators within an enterprise.

The priviledge_types table includes the priviledge_id and data type description fields. The data type description field stores a user defined description various data.

The client_customer_xref table includes the customer_id, client_id, and data distribution_date fields to cross reference a customer or a user with a client application and the date the client application was distributed to the user and the client device of the user.

The users_clients_xref table includes user_id, client_id, and create_date fields to cross reference a user identification with a client application identification and the most recent date the data was input into the table.

The licensing_state table includes the licensing_state_id and data state_description fields.

The clients_os_lookup table includes the os_id and data os_name and os_description fields. The os_id identifies which operating system runs on a particular client device. For example, the os_id field could indicate which operating system is run on user device 310. The os_name field indicates a name for the operating system, and the os_description field stores user defined comments.

The clients table includes the client_id, build_no, os_id, fields, and the description, and decommissioned fields for user defined comments.

FIGS. 6A-6F illustrate flowcharts to help better understand the invention. To begin, a user selects an application on user device 310 for execution. For example, the user selects a client application such as an enterprise instant messaging application for activation and execution on user device 310. The client application performs an authentication process to authenticate the user. If the user is not authenticated, the activation and execution of the application is stopped. If the user is affirmatively authenticated, the client application checks for the existence of a license file. If the license file is not expired, the application resumes normal execution and operation. If the license file is expired, the client application attempts to obtain a valid license from authorization system 340. Similarly, if a license file does not currently exist on user device 310, the client application will attempt to obtain a valid license from authorization system 340.

The license file contains a license file expiration date and an MD5 hashed value of a user identification (user ID) associated with the user. If a new user is utilizing the application and a pre-existing license file on the device is not associated with the new user, the pre-existing license record will first be deleted before user device 310 attempts to generate a new license record.

To obtain a valid license from authorization system 340, the client application on user device 310 transmits HTTP (hypertext transfer protocol) posts and responses over an encrypted connection (i.e. SSL/TLS) with authorization system 340. The client application transfers a user ID and the corresponding domain of the user attempting authentication. Additionally, specific elements related to the client application are transmitted. In response, authorization system 340 returns an XML (eXtensible markup language) stream with either the license contents or relative error code. The following is an example of an HTTP request:

POST /servlet/license HTTP/1.1

Host: licensing.meim.sprint.com

Connection: close

Accept-language: en-us

Pragma: no-cache

User-agent: Mozilla/4.0

Content-type: application/x-www-form-urlencoded

Content-length: 6129 userID=john.doe&domain=im.sprint.com.&client_build=01.06.12.01.00 . . .

In the illustrated HTTP request, the user ID identifies the user as John Doe. The domain is identified as im.company.com. The client build number is identified as client_build=01.06.12.01.00 . . . The client build number contains a reference to which operating system the application is intended for. For example, the application could be intended to operate with the Palm operating system for handheld computing devices.

The following is an example of an HTTP response:

HTTP/1.1 200 OK

Connection: close

Date: Thu, 06 Aug. 2003 12:00 12:00:15 GMT

Server: Apache/1.3.0 (Unix)

Last-Modified: Mon, 22 Jun. 2002 09:23:25 GMT

Content-type: text/plain

Content-length: 4352

<?xml version='1.0' ?>

<license>
 <return_code>300</return_code>
 <return_code_copy>Valid license assigned</return_code_copy>
 <userID>john.doe</userID>
 <domain>im.sprint.com</domain>
 <exp_date_hash>89489048504 . . . </exp_date_hash>
 <exp_date>15-SEP-2003 00:00:00</exp_date>
</license>

In the illustrated HTTP response, the user ID is John Doe. The domain in the HTTP response is im.company.com. The expiration date hash value is an MD5 encoded expiration date. The expiration date is represented as a string. The received clear text expiration date string must be hashed and compared to the received hash value for the client to validate the license before resuming execution of the application.

The following is an example of an HTTP error response:

POST /servlet/license HTTP/1.1

Host: licensing.meim.sprint.com

Connection: close

Accept-language: en-us

Pragma: no-cache

User-agent: Mozilla/4.0

Content-type: application/x-www-form-urlencoded

Content-length: 6129 key1=758947594 . . .

HTTP/1.1 200 OK

Connection: close

Date: Thu, 06 Aug. 2003 12:00 12:00:15 GMT

Server: Apache/1.3.0 (Unix)

Last-Modified: Mon, 22 Jun. 2002 09:23:25 GMT

Content-type: text/plain

Content-length: 4352

<?xml version='1.0' ?>

<license>
 <return_code>101</return_code>
 <return_code_copy>mal-formed domain</return_code>
</license>

The HTTP error response indicates a return code value. The following describes the various return codes and their associated meanings.

| Return Code | Description |
| --- | --- |
| 101 | Mal-formed domain |
| 102 | Domain not recognized |
| 201 | Pending user license successfully generated |
| 202 | Pending user license already exists |
| 300 | Valid assigned user license |
| 301 | Mal-formed user ID |
| 302 | User not authorized (no valid license) |
| 401 | Mal-formed client build number |
| 402 | Unrecognized client build number |
| 500 | Undetermined system error |
| 501 | Database I/O error |

Upon successfully establishing a connection between the client application on user device 310 and authorization system 340, authorization system 340 determines if a valid client build value was sent. If an unrecognized client build value was sent, authorization system 340 transmits an HTTP response with an appropriate error message to user device 310. The application presents an error message to the user indicating that the client build value was unrecognized by authorization system 340. If the client build number is recognized and the user has already been assigned a license key, authorization system 340 retrieves the license key from database system 344.

If authorization system 340 determines that the user has not been assigned a license, authorization system looks up the domain licensing type based on the domain for the user. If the domain is setup according to the rigid model, all users will have already been assigned a license. Therefore, a user without an assigned license cannot be allowed to use the application and a new license cannot be allocated for the user. The application presents an error message to the user indicating that the user is not authorized to use the application.

Under the unchecked diffusion licensing model, additional license are available to new users and a new license key is assigned to the user. If the license pool is depleted, the application displays an error message to the user indicating that there are no available licenses for the application. Under the checked diffusion licensing model, a pending license is assigned to the user. Pending licenses are not counted against the allocated licenses pool. A notification of the pending license is transferred to enterprise system 330. The client application displays a message on user device 310 to the user notifying the user that the enterprise IT staff has been appraised of the user's desire for a license.

After retrieving the license key, authorization system 340 transmits an HTTP response to the client application on user device 310. The HTTP response includes an expiration date for the license. The client application performs an MD5 hash on the expiration date and compares the derived hash value with the expiration date hash value provided by authorization system 340 in the HTTP response. If the derived hash value does not differ from the received hash value, user device 310 stores the expiration date and key in the license file. If the derived hash value differs from the received hash value, the application is prevented from running and a notice is displayed to the user that the user is not authorized to use the application.

When certain actions occur within authorization system 340, a notification trigger is invoked. Authorization system 340 transmits a notification message such as an email or an SMS notification to enterprise system 330 and/or user device 310. Examples of the notification message include the creation of a company or enterprise record in database system 344, deletion of a company or enterprise record, or an update to a record in database system 344. Additional examples of the notification message include notification of meeting a licensing threshold, creating a domain under a company, deleting a domain under a company, or updating the amount of allocated licenses for a domain. Still more examples of the notification message include a licensing notification that a threshold has been met for a domain, notification of a change in licensing mode for a domain, creation of a pilot (start date and duration), and updates applied to the pilot. Further examples of the notification also include notification of creation of a pending license request, approval of a pending license request, denial of a pending license request, allocation or creation of a license to an end-user, and revocation of a license to an end-user.

What is claimed is:

1. A method of operating an authorization network, the method comprising:
    in a service provider network, providing a wireless communication service to a user device operated by a user, wherein a service provider operates the service provider network and an authorization system;
    in an enterprise system, obtaining a license for an application from an application vendor and transferring authorization instructions for the license based on the license to the authorization system over an internet, wherein the enterprise system is operated by an enterprise, wherein the enterprise is not the service provider, wherein the user device has the application;
    in the authorization system, receiving the authorization instructions from the enterprise system, wherein the authorization instructions indicate authorization parameters comprising a quantity of users allowed to be authorized under the license and a quantity of users authorized under the license, receiving an authorization request from the user device through the service provider network, wherein the authorization request is transmitted wirelessly to the service provider network by the user device, wherein the user device transfers the authorization request each time the application is selected for execution, and wherein the authorization request indicates the application, the enterprise, and at least one of the user and the user device, and processing the authorization request and the authorization parameters to determine if the execution of the application is authorized based on the enterprise and a determination that the quantity of users authorized under the license is less than the quantity of users allowed to be authorized under the license, if the execution of the application is authorized, transferring an authorized message to the user device, wherein the user device executes the application in response to the authorized message and, if the execution of the application is not authorized, transferring an unauthorized message to the user device, wherein the user device does not execute the application in response to the unauthorized message.

2. The method of claim 1 comprising processing the authorization request and the authorization parameters to determine if the execution of the application is authorized based on at least one of the user and the user device.

3. The method of claim 1 further comprising in the authorization system, if the execution of the application is authorized, transferring a notification of a status of the license to the enterprise system.

4. The method of claim 1 wherein the user device deletes the application in response to the unauthorized message.

5. The method of claim 1 wherein the authorization message indicates an expiration date of the license.

6. The method of claim 1 wherein the application comprises an instant messaging application.

7. An authorization system located in a service provider network operated by a service provider that provides a wireless communication service to a user device operated by a user where the enterprise is not the service provider, the authorization system comprising:
    a first interface configured to receive authorization instructions from an enterprise system operated by the enterprise and receive an authorization request from the user device through the service provider network, wherein the user device has an application, wherein the authorization instructions are transferred over an internet, wherein the authorization instructions indicate authorization parameters, wherein the authorization parameters comprise a quantity of users allowed to be authorized under the license and a quantity of users authorized under the license, and are based on a license obtained by the enterprise system from an application vendor for the application, wherein the authorization request is transmitted wirelessly to the service provider network, wherein the user device transfers the authorization request each time the application is selected for execution, and wherein the authorization request indicates the application, the enterprise, and at least one of the user and the user device;
    a processing system configured to process the authorization request and the authorization parameters to determine if the execution of the application is authorized based on the enterprise and a determination that the quantity of users authorized under the license is less than the quantity of users allowed to be authorized under the license; and
    a second interface configured to transfer an authorized message to the user device if the execution of the application is authorized and transfer an unauthorized message to the user device if the execution of the application is not authorized, wherein the user device executes the application in response to the authorized message and wherein the user device does not execute the application in response to the unauthorized message.

8. The authorization system of claim 7 wherein the processing system is configured to process the authorization request and the authorization parameters to determine if the execution of the application is authorized based on at least one of the user and the user device.

9. The authorization system of claim 7 wherein the second interface, if the execution of the application is authorized, is further configured to transfer a notification of a status of the license to the enterprise system.

10. The authorization system of claim 7 wherein the user device deletes the application in response to the unauthorized message.

11. The authorization system of claim 7 wherein the authorization message indicates an expiration date of the license.

12. The authorization system of claim 7 wherein the application comprises an instant messaging application.

13. An authorization network comprising:
- a service provider network, wherein the service provider network provides a wireless communication service to a user device, wherein a service provider operates the service provider network and an authorization system;
- an enterprise system, wherein the enterprise system obtains a license for an application from an application vendor and transfers authorization instructions for the license based on the license to the authorization system over an internet, wherein the enterprise system is operated by an enterprise, wherein the enterprise is not the service provider, wherein the user device operated by a user has the application; and
- the authorization system, wherein the authorization system receives the authorization instructions from the enterprise system, wherein the authorization instructions indicate authorization parameters comprising a quantity of users allowed to be authorized under the license and a quantity of users authorized under the license, receives an authorization request from the user device through the service provider network, wherein the authorization request is transmitted wirelessly to the service provider network by the user device, wherein the user device transfers the authorization request each time the application is selected for execution, and wherein the authorization request indicates the application, the enterprise, and at least one of the user and the user device, and
- wherein the authorization system processes the authorization request and the authorization parameters to determine if the execution of the application is authorized based on the enterprise and a determination that the quantity of users authorized under the license is less than the quantity of users allowed to be authorized under the license, transfers an authorized message to the user device if the execution of the application is authorized, and transfers an unauthorized message to the user device if the execution of the application is not authorized, wherein the user device executes the application in response to the authorized message and wherein the user device does not execute the application in response to the unauthorized message.

14. The authorization network of claim 13 wherein the authorization system processes the authorization request and the authorization parameters to determine if the execution of the application is authorized based on at least one of the user and the user device.

15. The authorization network of claim 13 wherein the authorization system, if the execution of the application is authorized, transfers a notification of a status of the license to the enterprise system.

16. The authorization network of claim 13 wherein the user device deletes the application in response to the unauthorized message.

17. The authorization network of claim 13 wherein the authorization message indicates an expiration date of the license.

18. The authorization network of claim 13 wherein the application comprises an instant messaging application.

* * * * *